(12) United States Patent
Drzymala et al.

(10) Patent No.: US 12,056,567 B2
(45) Date of Patent: Aug. 6, 2024

(54) BIOPTIC BARCODE READER AND CARRIER ASSEMBLY FOR A BIOPTIC BARCODE READER

(71) Applicant: ZEBRA TECHNOLOGIES CORPORATION, Lincolnshire, IL (US)

(72) Inventors: Mark Drzymala, Saint James, NY (US); Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 226 days.

(21) Appl. No.: 17/333,283

(22) Filed: May 28, 2021

(65) Prior Publication Data
US 2022/0383009 A1    Dec. 1, 2022

(51) Int. Cl.
*G06K 7/10*    (2006.01)
*G06K 7/14*    (2006.01)

(52) U.S. Cl.
CPC ..... *G06K 7/10554* (2013.01); *G06K 7/10831* (2013.01); *G06K 7/1413* (2013.01)

(58) Field of Classification Search
CPC ........... G06K 7/10554; G06K 7/10831; G06K 7/1096; G06K 7/1098
USPC ............. 235/462.14, 462.35, 462.41, 462.43
See application file for complete search history.

(56) References Cited

U.S. PATENT DOCUMENTS

| | | | |
|---|---|---|---|
| 2008/0067252 A1* | 3/2008 | Detwiler | G06K 7/1096 235/462.43 |
| 2009/0206161 A1* | 8/2009 | Olmstead | G06K 7/10702 235/462.41 |
| 2010/0163626 A1* | 7/2010 | Olmstead | G06K 7/10702 235/462.41 |
| 2013/0126617 A1* | 5/2013 | Olmstead | G06K 7/10 235/462.25 |
| 2013/0181051 A1* | 7/2013 | Olmstead | G06K 7/1096 235/440 |
| 2013/0306727 A1* | 11/2013 | Shearin | G06K 7/10 235/440 |
| 2013/0327829 A1* | 12/2013 | Thompson | G06K 7/10841 235/440 |

(Continued)

FOREIGN PATENT DOCUMENTS

WO    2023/278197 A1    1/2023
WO    2023/101752 A1    6/2023

OTHER PUBLICATIONS

Examination Report for Great Britain Application No. GB22075501 mailed on Nov. 23, 2022.

(Continued)

*Primary Examiner* — Paultep Savusdiphol

(57) ABSTRACT

Bioptic barcode readers are disclosed herein. An example bioptic barcode reader includes an upper housing and a lower housing secured directly to the upper housing, the lower housing and the upper housing defining an interior region. The upper housing includes a horizontally extending portion, an integral and unitary tower portion extending above the horizontally extending portion, a generally horizontal window positioned in the horizontally extending portion, and a generally upright window positioned in the tower portion. An imaging sensor, at least one intermediate mirror, at least one vertical output mirror, and at least one horizontal output mirror are positioned within the interior region.

22 Claims, 12 Drawing Sheets

(56) References Cited

U.S. PATENT DOCUMENTS

| | | | |
|---|---|---|---|
| 2013/0327830 A1* | 12/2013 | Thompson | G06K 7/1096 |
| | | | 235/440 |
| 2013/0328682 A1* | 12/2013 | Shearin | G06K 7/1096 |
| | | | 235/462.43 |
| 2014/0183262 A1* | 7/2014 | Wittenberg | G06K 7/1096 |
| | | | 235/440 |
| 2014/0183263 A1* | 7/2014 | Chen | G06K 7/10752 |
| | | | 235/440 |
| 2021/0049330 A1 | 2/2021 | Jaffri et al. | |
| 2021/0142015 A1 | 5/2021 | Drzymala et al. | |
| 2023/0169285 A1 | 6/2023 | Handshaw et al. | |

OTHER PUBLICATIONS

Examination Report for Great Britain Application No. GB2303863.1 mailed on Jun. 13, 2023.

* cited by examiner

BIOPTIC BARCODE READER AND CARRIER ASSEMBLY FOR A BIOPTIC BARCODE READER

BACKGROUND

Bioptic barcode readers traditionally use housing assemblies that have three or more housing portions and various covers, which creates a large number of electrostatic discharge, water, and dust paths that must be controlled and requires a large number of seals, which makes sealing the housing assembly and protecting internal components more difficult. It also makes access to the optical and electronic components more complicated since the components are distributed through the housing sections with cabling passing between the components and through all the housings portions.

In addition, with the optical and electronic components distributed and mounted to different housing sections the entire bioptic barcode reader has to be assembled before it can be tested, which then requires disassembly if a problem is found during testing. It also makes it difficult to service the optical and electronic components. For example, to disassemble or service a traditional barcode reader, various electronic components and printed circuit boards must be disconnected, which can risk broken connectors. Furthermore, in cases where the problem with a bioptic barcode reader is not obvious, the entire bioptic barcode reader must typically be shipped out in order to service it.

SUMMARY

In an embodiment, the present invention is a barcode reader comprising an upper housing and a lower housing secured directly to the upper housing, the lower housing and the upper housing defining an interior region. The upper housing includes a horizontally extending portion, an integral and unitary tower portion extending above the horizontally extending portion, a generally horizontal window positioned in the horizontally extending portion, and a generally upright window positioned in the tower portion. An imaging sensor, at least one intermediate mirror, at least one vertical output mirror, and at least one horizontal output mirror are positioned within the interior region.

In a variation of this embodiment, the imaging sensor, the intermediate mirror, and that at least one vertical output mirror are each mounted onto a carrier frame.

In another embodiment, the present invention is a carrier assembly for a bioptic barcode reader, the carrier assembly comprising a carrier frame, an imaging sensor mounted on the carrier frame, an intermediate mirror mounted on the carrier frame, and at least one vertical output mirror mounted on the carrier frame.

In a variation of this embodiment, the carrier frame is a single, integral, unitary part and is configured to be inserted and removed from a housing assembly of the bioptic barcode reader as a single unit.

In another embodiment, the present invention is a method of assembling a bioptic barcode reader, comprising the steps of: assembling a carrier assembly by mounting an imaging sensor, an intermediate mirror, and at least one vertical output mirror onto a carrier frame; securing at least one horizontal output mirror in a lower housing of the bioptic barcode reader; positioning the carrier assembly between the lower housing and an upper housing of the bioptic barcode reader; and securing the upper housing directly to the lower housing such that the carrier assembly is positioned within an interior region of the bioptic barcode reader defined by the lower housing and the upper housing.

In a variation of this embodiment, the carrier frame is a single, integral, unitary part.

In another embodiment, the present invention is a method of repairing a bioptic barcode reader, comprising the steps of: disconnecting an upper housing of the bioptic barcode reader from a lower housing of the bioptic barcode reader; removing a first carrier assembly from the upper housing and the lower housing, the first carrier assembly including a first carrier frame and a first imaging sensor, a first intermediate mirror, at least one first vertical output mirror, each mounted on the carrier frame; positioning a second carrier assembly between the upper housing and the lower housing, the second carrier assembly including a second carrier frame and a second imaging sensor, a second intermediate mirror, at least one second vertical output mirror, each mounted on the carrier frame; and securing the upper housing to the lower housing.

In a variation of this embodiment, the upper housing is secured directly to the lower housing.

In another variation of this embodiment, the first carrier frame is a single, integral, unitary part and the second carrier frame is a single, integral, unitary part.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
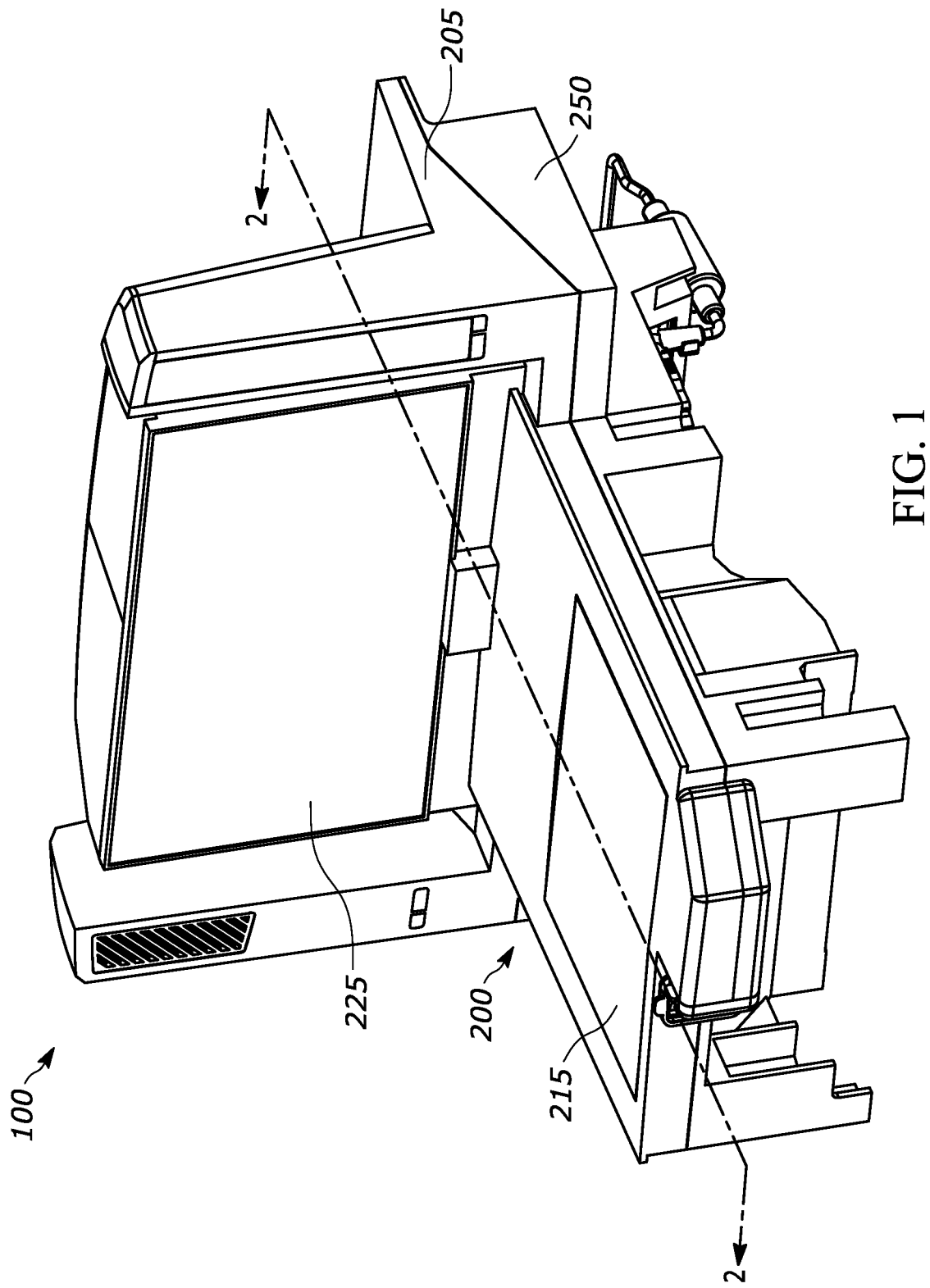
FIG. 1 illustrates a perspective view of an example bioptic barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The examples disclosed herein relate to bioptic barcode readers that have only two parts to the housing assembly, an upper housing and a lower housing secured directly to the upper housing, rather than the traditional three-piece housing with an intermediate housing positioned between the upper and lower housings and do not have any removable covers in the upper or lower housings. The use of only an upper and lower housing, without any intermediate housing between the upper and lower housing, and no removable covers in the upper or lower housing simplifies sealing and reduces the number of seams and required seals, which can minimize electrostatic discharge and dust, and liquid from entering the housing of the bioptic barcode reader.

The example bioptic barcode readers also include a carrier assembly positioned between the upper and lower housing that includes a single carrier frame that carries all of the optical and electronic components of the bioptic barcode reader, except the horizontal output mirror, which makes assembly and repair of bioptic barcode reader and access to the electronics simpler.

As discussed below, having all of the optical and electronic components of the bioptic barcode reader mounted to a single rigid carrier frame helps with a number of tolerance and pointing situations, such as: minimized tolerance between imaging and illumination for the vertical, horizontal, and color camera systems; more accurate location of the user interface board against the upper housing to result in less variation of capacitive touch signal and more consistent illumination of lightpipes without extra support parts; reduced pointing of the left and right off-platter detection systems to reduce false alerts; easier installation, servicing, and debugging of the entire opto-electronic system. In addition, the carrier assembly with all of the optical and electronic components can be tested prior to full assembly of bioptic barcode reader, where in the past the entire bioptic barcode reader would have to be assembled before could be tested, which then requires disassembly if a problem is found during testing. Furthermore, it is also easier to build and test the carrier assembly before it is installed in the housing assembly and easier to service the optical and electronic components since printed circuit boards do not have to be disconnected from other electronics, which reduces the risk of broken connectors.

The use of the disclosed carrier assembly effectively creates a single serviceable assembly that can be sent out in a much smaller package in the case that off-site servicing is necessary. There are also no internal interconnects that need to be operated during service. Having such a small assembly that is easily installed and removed from the housing assembly means that a spare could be kept on site and be easily swapped out in order to keep the bioptic barcode reader operational.

Referring to FIGS. 1-6, an example bioptic barcode reader 100 is shown that includes a housing assembly 200 with an upper housing 205 and a lower housing 250, which together define an interior region 265 of bioptic barcode reader 100. Lower housing 250 is secured directly to upper housing 205, for example with threaded members, without any intermediate housing portion positioned between upper housing 205 and lower housing 250. A seal 280 can be positioned between upper housing 205 and lower housing 250, which can minimize electrostatic discharge and dust, and liquid from entering interior region 265. In the example shown, neither upper housing 205 nor lower housing 250 have any removable covers, which further minimizes electrostatic discharge and dust, and liquid from entering interior region 265 through upper housing 205 and lower housing 250.

Figure 2A:
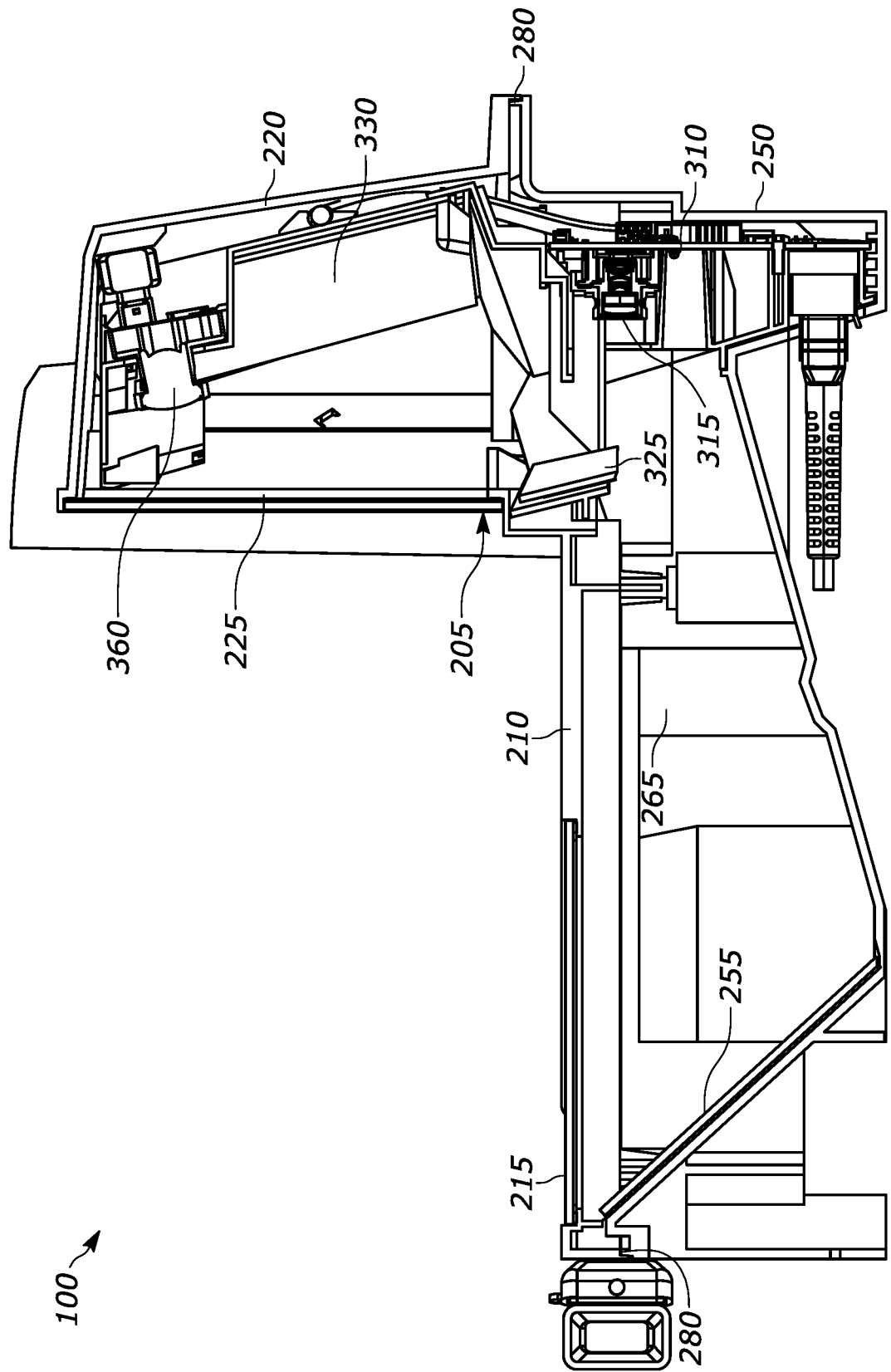
FIG. 2A illustrates a side cross-sectional view of the bioptic barcode reader of FIG. 1, taken along line 2-2 in FIG. 1.
Figure 2B:
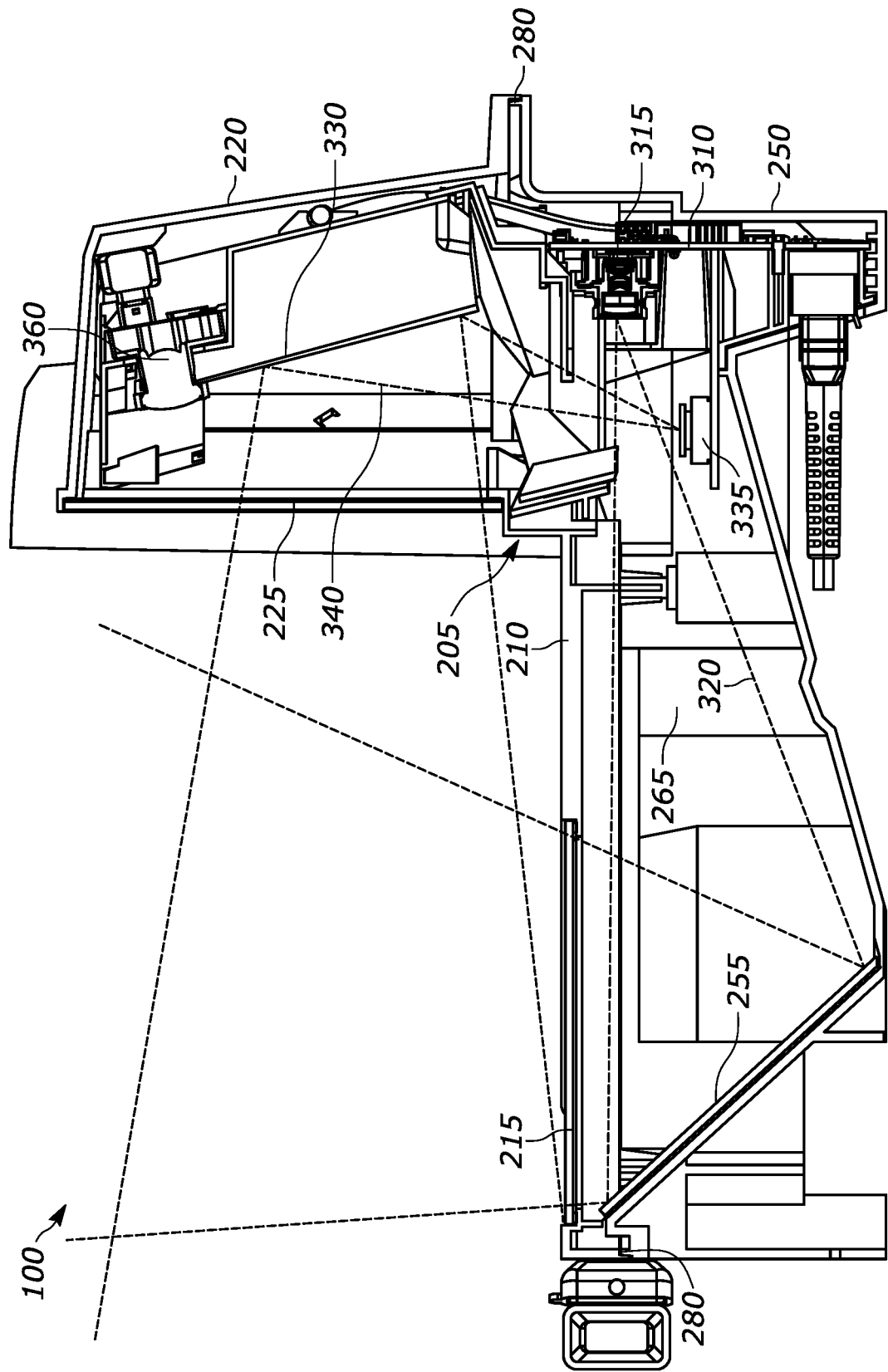
FIG. 2B illustrates the cross-section view of FIG. 2A with an optional arrangement of optical and electronic components.
Figure 3:
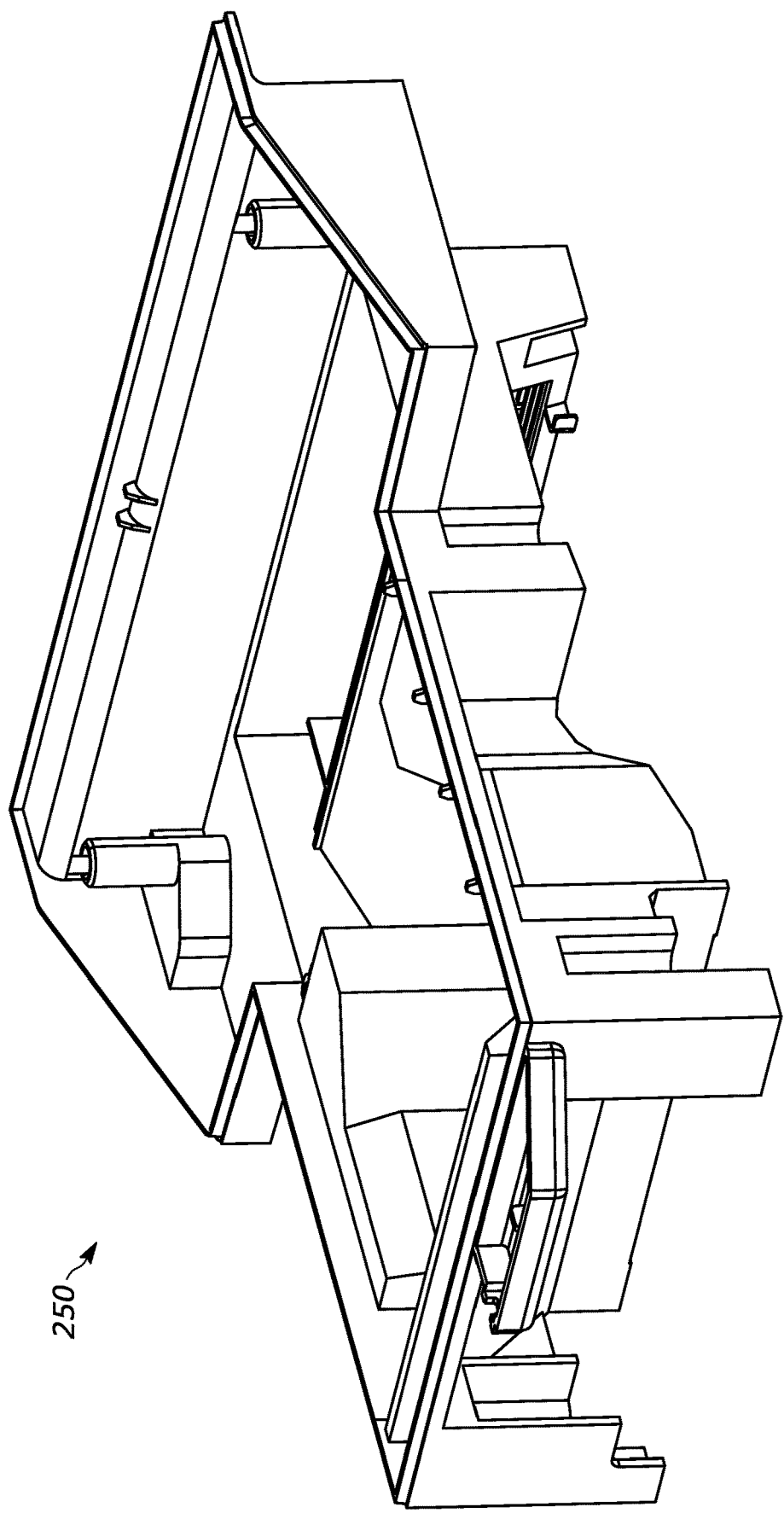
FIG. 3 illustrates a perspective view of an example lower housing of the bioptic barcode reader of FIG. 1.
Figure 4:
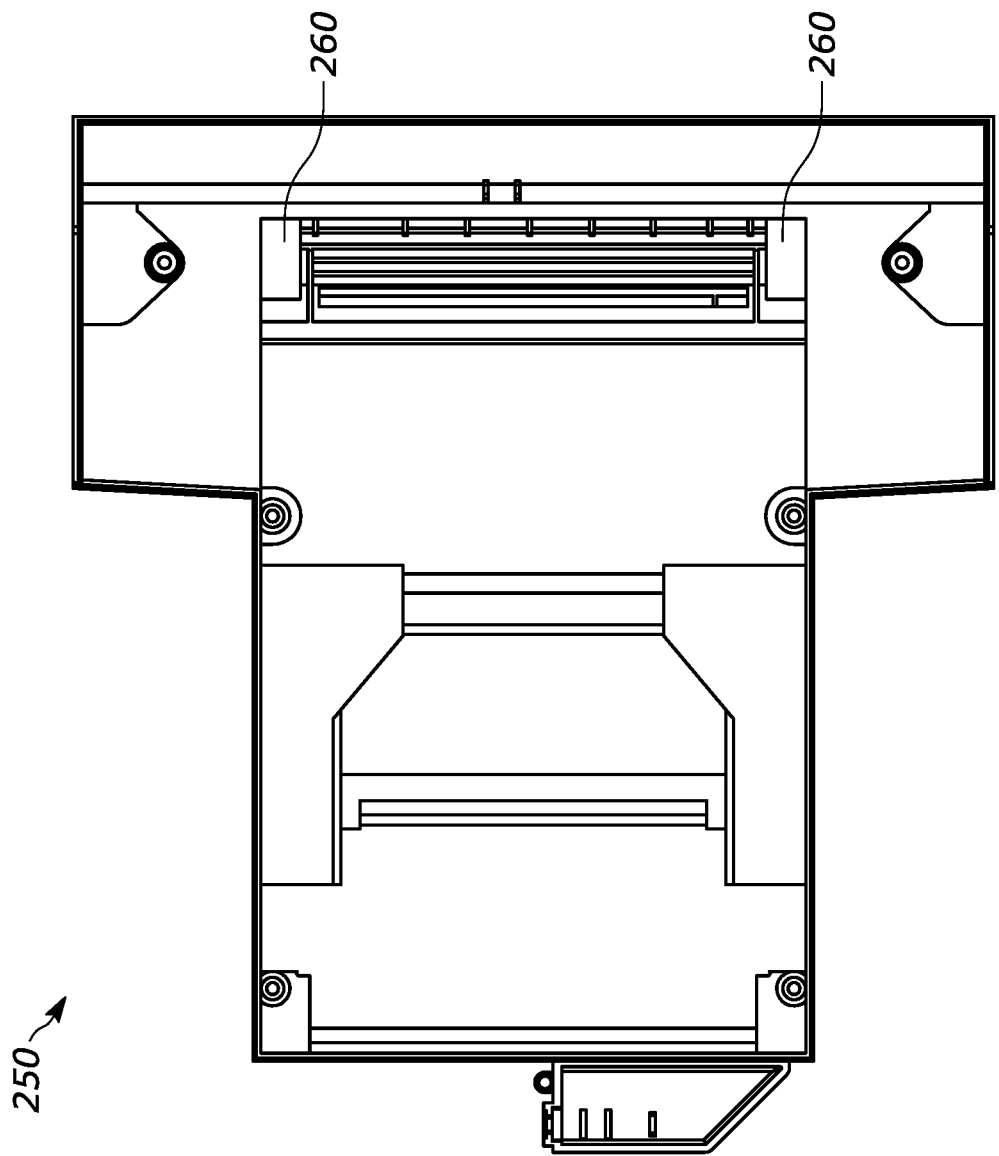
FIG. 4 illustrates a top view of the lower housing of FIG. 3.

As can be seen in FIG. 2A, bioptic barcode reader 100 can include various optical and electronic components, such as an imaging sensor 315, at least one intermediate mirror 325, at least one vertical output mirror 330, and at least one horizontal output mirror 255 positioned in interior region 265. With this arrangement of components, intermediate mirror 325 is a splitter mirror and a field-of-view of imaging sensor 315 is split by intermediate mirror 325 into a first portion and a second portion, with the first portion being directed out of generally horizontal window 215 by horizontal output mirror 255 and the second portion being directed out of generally upright window 225 by vertical output mirror 330. As shown in the example shown in FIG. 2A, intermediate mirror 325 is a concave splitter mirror that directs one part of the second portion to a first vertical output mirror 330 and a second part of the second portion to a second vertical output mirror 330. Alternatively, intermediate mirror 325 could also be a convex splitter mirror that directs the second portion to two vertical output mirrors 330 or intermediate mirror 325 could be a planar splitter mirror that directs the entire second portion to a single vertical output mirror 330. In addition, rather than having a single imaging sensor 315 with a split field of view, bioptic barcode reader 100 can have a second imaging sensor 335, where a first field-of-view 320 of imaging sensor 315 is directed out of generally horizontal window 215 by horizontal output mirror 255 and a second field-of-view 340 of second imaging sensor 335 is directed out of generally upright window 225 by vertical output mirror 330.

Although not required, bioptic barcode reader 100 can also include additional optical and electronic components, such as a vertical illumination printed circuit board 345, a user interface printed circuit board 350, a speaker 355, a color vision camera 360, a color vision camera illumination printed circuit board 365, and an off-platter detection system printed circuit board 370. In the example shown, horizontal output mirror 255 is mounted onto lower housing 250 and imaging sensor 315, intermediate mirror 325, vertical output mirrors 330, vertical illumination printed circuit board 345, user interface printed circuit board 350, speaker 355, color vision camera 360, color vision camera illumination printed circuit board 365, off-platter detection system printed circuit board 370, and second imaging sensor 335 can be mounted onto a carrier frame 305 of carrier assembly 300, as described in more detail below.

Figure 5:
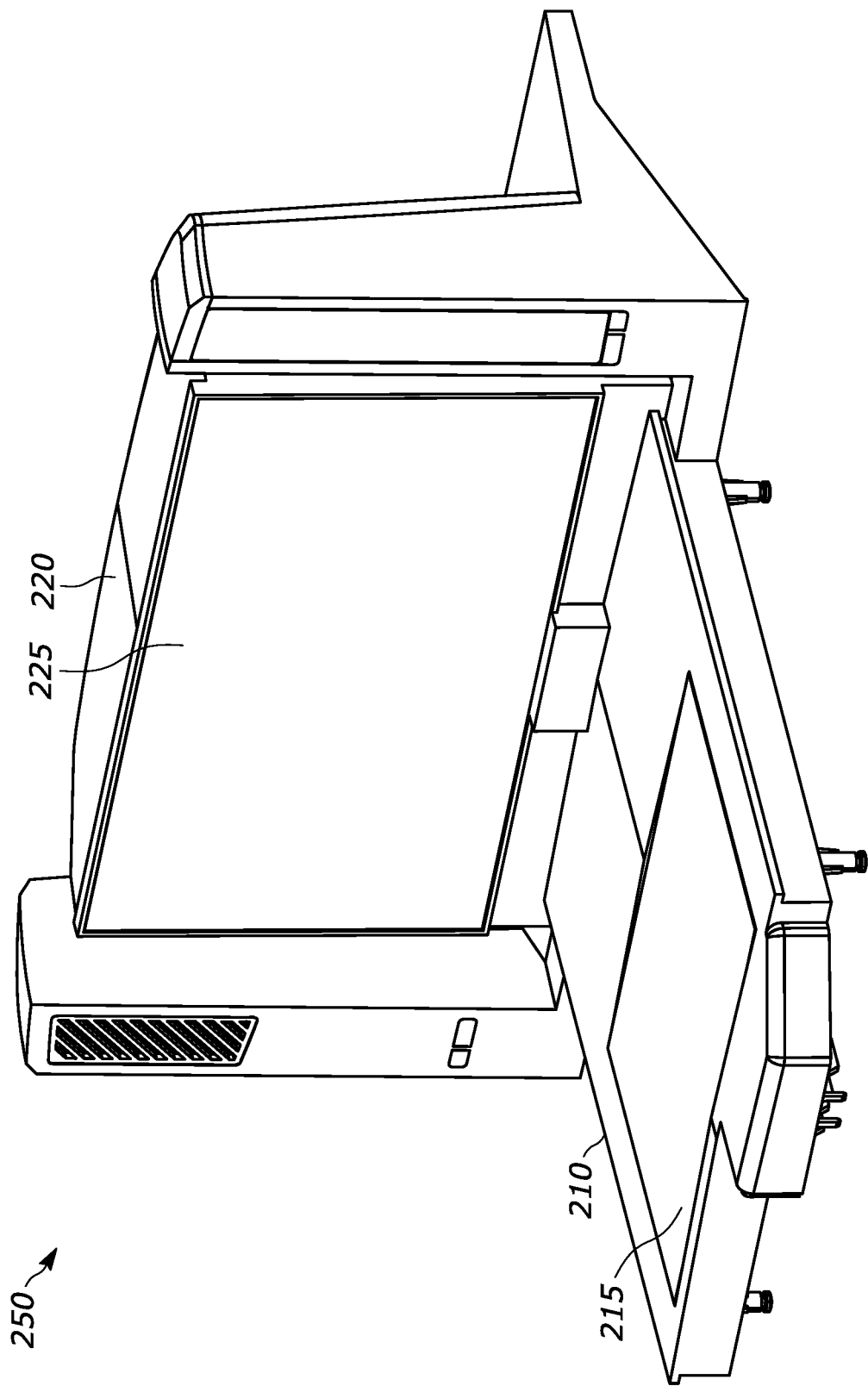
FIG. 5 illustrates a perspective view of an example upper housing of the bioptic barcode reader of FIG. 1.
Figure 6:
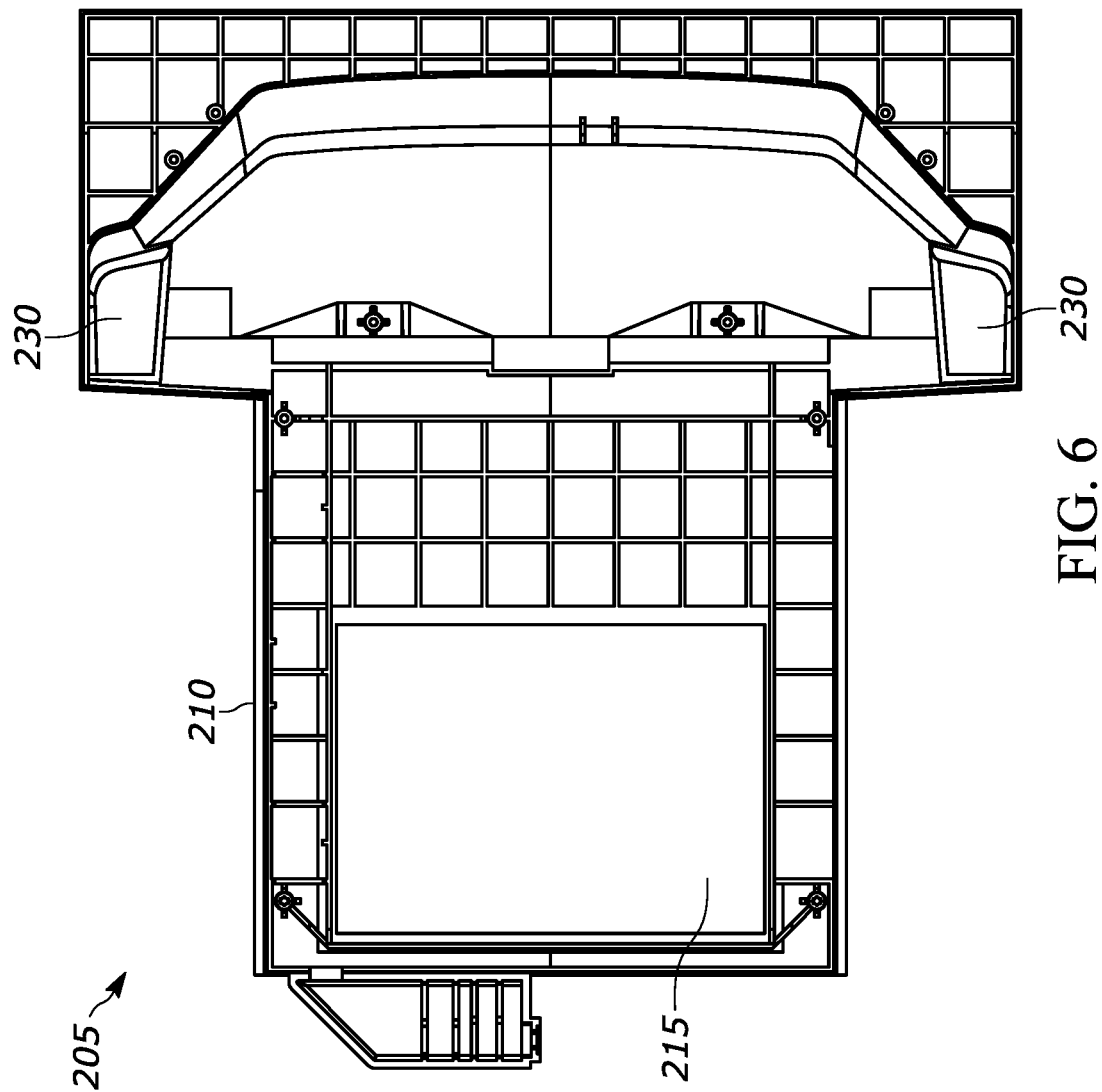
FIG. 6 illustrates a bottom view of the upper housing of FIG. 5.
Figure 7:
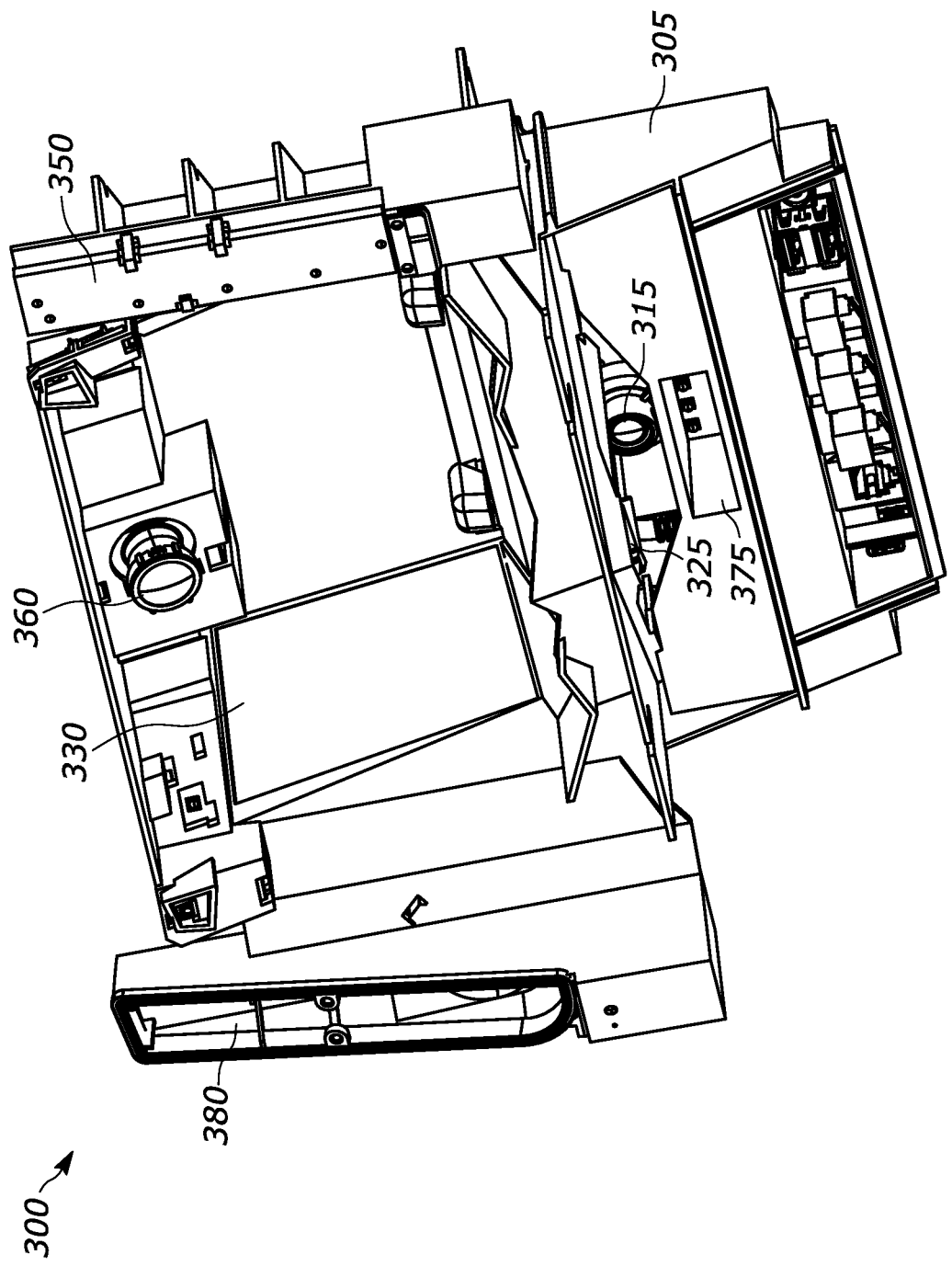
FIG. 7 illustrates a perspective view of an example carrier assembly of the bioptic barcode reader of FIG. 1.
Figure 8:
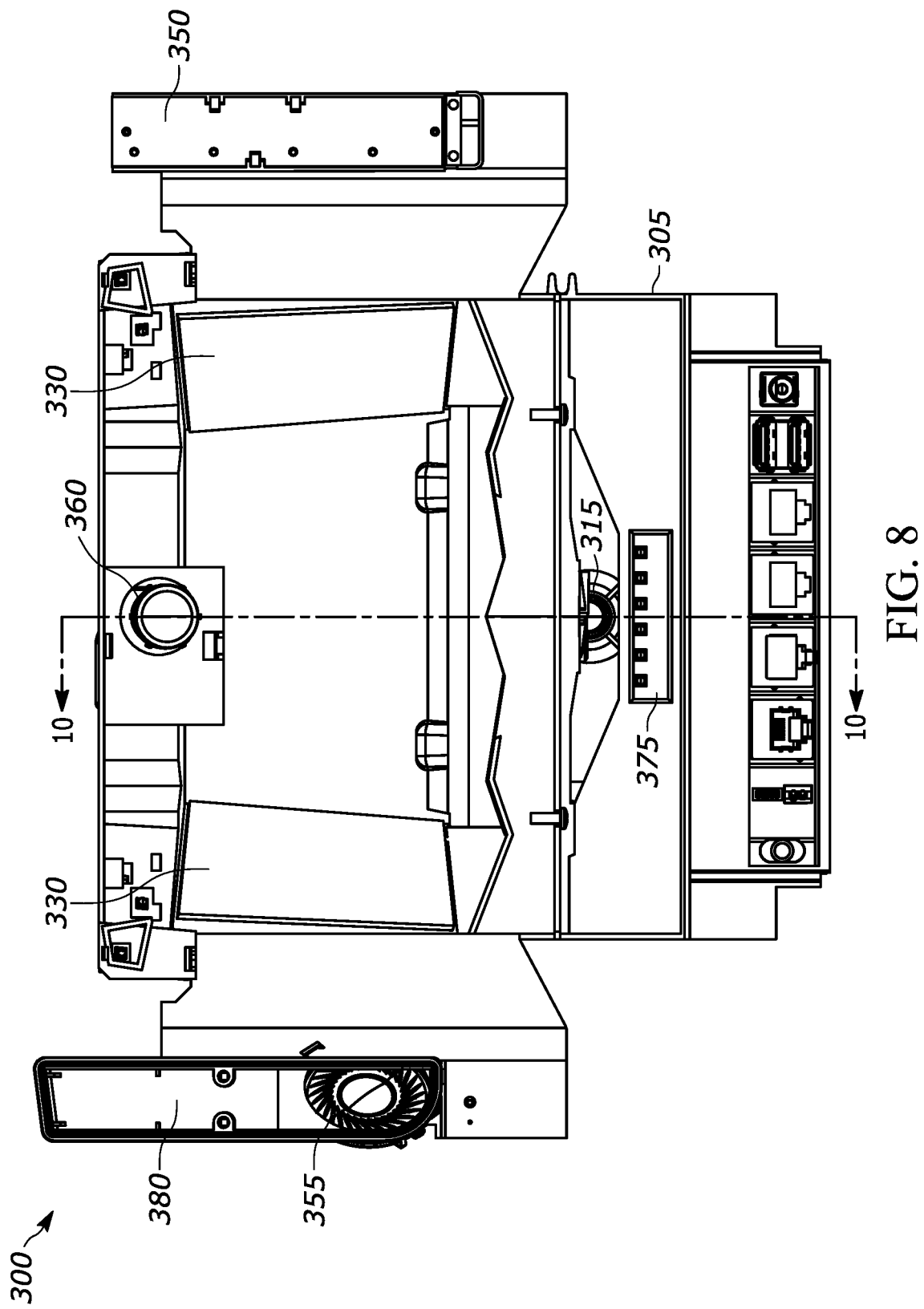
FIG. 8 illustrates a front view of the carrier assembly of FIG. 7.
Figure 9:
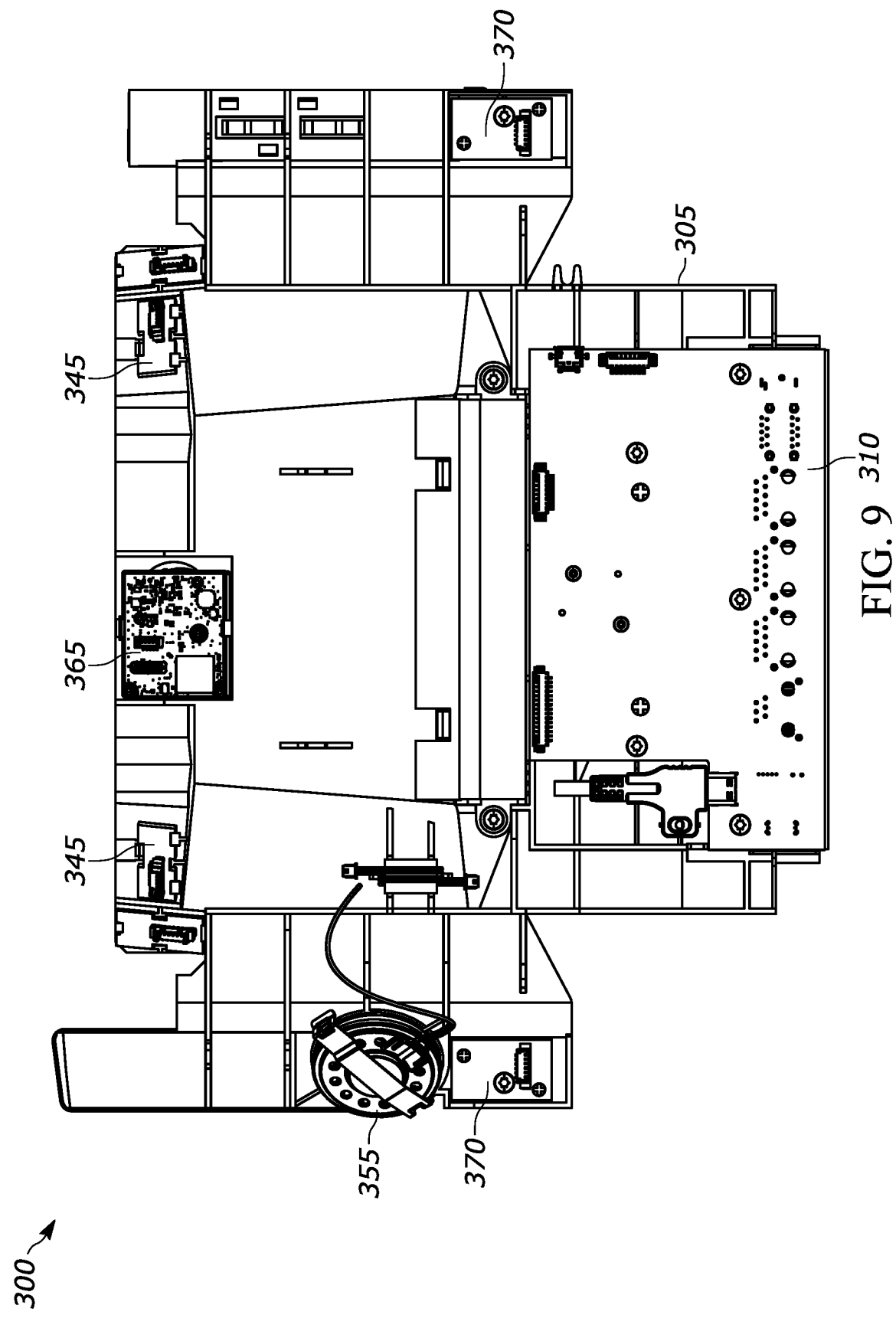
FIG. 9 illustrates a rear view of the carrier assembly of FIG. 7.
Figure 10:
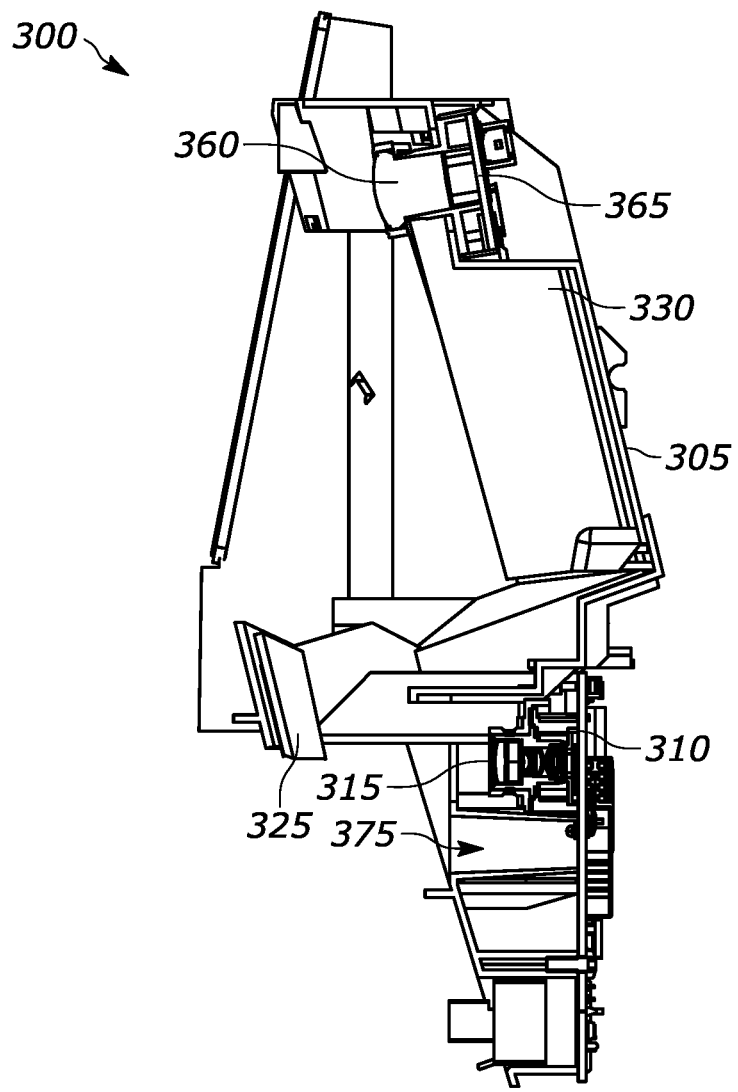
FIG. 10 illustrates a side cross-sectional view of the carrier assembly of FIG. 7 taken along line 10-19 in FIG. 8.

As can be seen in FIGS. 5 and 6, the example upper housing 205 of bioptic barcode reader 100 includes a horizontally extending portion 210 and an integral and unitary tower portion 220 extending above horizontally extending portion 210, that are a single, unitary, integrated part. A generally horizontal window 215 is positioned in horizontally extending portion 210 and a generally upright window 225 is positioned in tower portion 220. Having all of the windows of bioptic barcode reader 100, horizontal window 215 and upright window 225, attached to upper housing 205 (rather than the horizontal window attached to an intermediate housing and the upright window attached to an upper housing), improves the serviceability of bioptic barcode reader 100 since only upper housing 205 would have to be replaced if either window is scratched, cracked, or damaged.

Referring to FIGS. 7-10, an example carrier assembly 300 for bioptic barcode reader 100 is shown, which can include many of the required optical and electronic components of bioptic barcode reader 100 and is configured to be easily inserted into and removed from housing assembly 200 of bioptic barcode reader 100 as a single unit for ease of assembly and repair. In addition, since the electronic components that require interconnected are all included in carrier assembly 300, carrier assembly can be easily removed from housing assembly 200 without any electrical disconnections.

Figure 11:
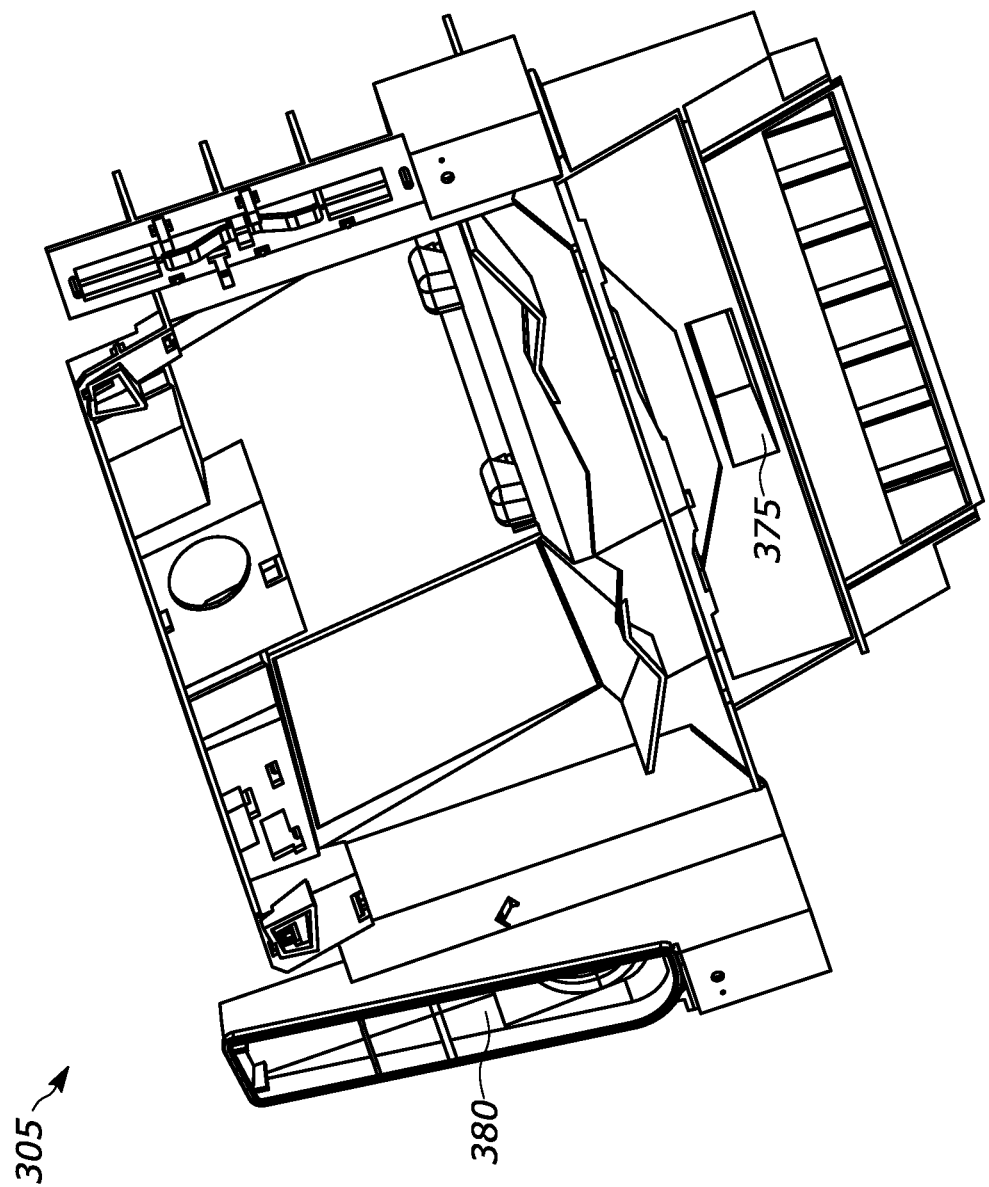
FIG. 11 illustrates a perspective view of an example carrier frame of the carrier assembly of FIG. 7.

Carrier assembly 300 includes a carrier frame 305 (see FIG. 11), which in the example shown is a single, integral, unitary part that can be configured to be received in a first set of channels 230 formed in upper housing 205 and in a second set of channels 260 formed in lower housing 250 to locate and orient carrier frame 305 within bioptic barcode reader 100. Various optical and electronic components of bioptic barcode reader 100 are mounted to carrier frame 305, such as imaging sensor 315, intermediate mirror 325, and at least one vertical output mirror 330. Imaging sensor 315 can be mounted directed to carrier frame 305 or a main printed circuit board 310 can be mounted to carrier frame 305 and imaging sensor 315 mounted on main printed circuit board 310. Although main printed circuit board 310 is shown being mounted vertically with the field-of-view of imaging sensor 315 straight at horizontal output mirror 255 and split by intermediate mirror 325 to vertical output mirror 330, main printed circuit board 310 could also be mounted horizontally with the field-of-view of imaging sensor 315 straight at vertical output mirror 330 and split by intermediate mirror 325 to horizontal output mirror 255. In addition, as described above, intermediate mirror 325 can be a splitter mirror that is planar, concave, or convex and if bioptic barcode reader 100 has multiple vertical output mirrors 330, each vertical output mirror 330 can be mounted on carrier frame 305. One advantage provide by a single, integral, unitary carrier frame 305 is that imaging sensor 315 and intermediate mirror 325 are attached to the same part, which minimizes tolerances and shift between the imaging sensor 315 and intermediate mirror 325 to ensure that the split of the field-of-view of imaging sensor 315 is located in a consistent spot between different carrier assemblies 300 and bioptic barcode readers 100. This results in fewer pixels that might be lost in the field-of-view of imaging sensor 315. In addition, mounting vertical output mirror(s) 330 on carrier frame 305 with imaging sensor 315 and intermediate mirror 325 creates an ideal tolerance situation for the vertical system which minimizes field-of-view pointing error. Furthermore, since horizontal output mirror 255 is far along the path of the field-of-view of imaging sensor 315, the pointing error for the horizontal system is also minimized. All of this helps with tolerances to minimize pointing error and maximize usable pixels of imaging sensor 315 in bioptic barcode reader 100.

Additional optical and electronic components can also be mounted onto carrier frame 305, such as vertical illumination printed circuit board 345, user interface printed circuit board 350, speaker 355, color vision camera 360, color vision camera illumination printed circuit board 365, and/or off-platter detection system printed circuit board 370. Carrier frame 305 can also have additional features formed into carrier frame 305, such as a horizontal illumination cavity 375 to confine the horizontal illumination and direct is through bioptic barcode reader 100 and/or a sound chamber 380 that assists in directing sound out of bioptic barcode reader 100.

As mentioned above, the use of carrier assembly 300 to carry most of the optical and electronic components of bioptic barcode reader 100 makes the assembly of bioptic barcode reader faster and easier than traditional bioptic barcode readers. For example, to assemble bioptic barcode reader 100, carrier assembly 300 is assembled by mounting imaging sensor 315, intermediate mirror 325, and vertical output mirror 330 onto carrier frame 305. As described above, imaging sensor 315 can be mounted directly to carrier frame 305 or imaging sensor 315 can be mounted to main printed circuit board 310 and main printed circuit board 310 can be mounted to carrier frame 305. In addition, a planar intermediate mirror 325 and a single vertical output mirror 330 or a concave or convex intermediate mirror 325 and two vertical output mirrors 330 can be mounted to carrier frame 305. Depending on the desired features of bioptic barcode reader 100, additional optical and electronic components can also be mounted onto carrier frame 305, such as vertical illumination printed circuit board 345, user interface printed circuit board 350, speaker 355, color vision camera 360, color vision camera illumination printed circuit board 365, and/or off-platter detection system printed circuit board 370. Horizontal output mirror 255 is also secured in lower housing 250 of bioptic barcode reader 100.

Once assembled, carrier assembly 300 is positioned between lower housing 250 and upper housing 205 as a single unit, preferably by inserting carrier assembly 300 into first set of channels 230 formed in upper housing 205 and into second set of channels 260 formed in lower housing 250, to locate and orient carrier assembly 300 within bioptic barcode reader 100. Upper housing 205 is then secured directly to lower housing 250, for example, with threaded members, so that carrier assembly 300 is positioned and secured within interior region 265. As described above, upper housing 205 is secured directly to lower housing 250 without any intermediate housing between upper housing 205 and lower housing 250. However, before upper housing 205 is secured to lower housing 250, a seal 280 can be positioned between upper housing 205 and lower housing 250 to electrostatic discharge and dust, and liquid from entering interior region 265.

Similarly, the repair of bioptic barcode reader 100 is also made faster and easier with the use of carrier assembly 300. For example, to repair bioptic barcode reader 100 upper housing 205 can be disconnected from lower housing 250, for example, by removing threaded members from between upper housing 205 and lower housing 250, and a first carrier assembly 300 can be removed from upper housing 205 and lower housing 250. A second carrier assembly 300 can then be positioned between upper housing 205 and lower housing 250, preferably by inserting second carrier assembly 300 into first set of channels 230 formed in upper housing 206 and into second set of channels 260 formed in lower housing 250 to locate and orient second carrier assembly 300 within bioptic barcode reader 100. Upper housing 205 can then be secured to lower housing 250, for example, by threaded members between upper housing 205 and lower housing 250.

As discussed above, upper housing 205 is preferably secured directly to lower housing 250, without any intermediate housing between upper housing 205 and lower housing 250, and seal 280 is positioned between upper housing 205 and lower housing 250. In addition, the first and second carrier assemblies 300 can each include a carrier frame 305 and various optical and electronic components, such as imaging sensor 315, intermediate mirror 325, and one or more vertical output mirrors 330. As described above, imaging sensors 315 can be mounted directly to first and second carrier frames 305 or imaging sensors 315 can be mounted to main printed circuit boards 310 and the main printed circuit boards 310 mounted to the carrier frames 305 of first and second carrier assemblies 300. Depending on the desired features and functionality of bioptic barcode reader 100, first and second carrier assemblies 300 can also include a vertical illumination printed circuit board 345, a user interface printed circuit board 350, a speaker 355, a color vision camera 360, a color vision camera illumination printed circuit board 365, and/or an off-platter detection system printed circuit board 370 mounted on the first and second carrier frames 305.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined as within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A bioptic barcode reader, comprising:
   an upper housing including a horizontally extending portion, an integral and unitary tower portion extending above the horizontally extending portion, a generally horizontal window positioned in the horizontally extending portion, and a generally upright window positioned in the tower portion;
   a lower housing secured directly to the upper housing, the lower housing and the upper housing defining an interior region, wherein the lower housing is separate from the upper housing, and the lower housing is secured to the upper housing by joining the lower housing directly to the upper housing; and
   an imaging sensor, at least one intermediate mirror, at least one vertical output mirror, and at least one horizontal output mirror positioned within the interior region.

2. The bioptic barcode reader of claim 1, comprising a seal positioned between the upper housing and the lower housing.

3. The bioptic barcode reader of claim 1, wherein the upper housing does not include any removable covers and the lower housing does not include any removable covers.

4. The bioptic barcode reader of claim 1, wherein the imaging sensor, the intermediate mirror, and that at least one vertical output mirror are each mounted onto a carrier frame.

5. The bioptic barcode reader of claim 4, comprising a second imaging sensor mounted on to the carrier frame, wherein a first field of view of the imaging sensor is directed out of the generally horizontal window and a second field of view of the second imaging sensor is directed out of the generally upright window.

6. The bioptic barcode reader of claim 4, wherein the imaging sensor is mounted to a main printed circuit board and the main printed circuit board is mounted onto the carrier frame.

7. The bioptic barcode reader of claim 4, wherein the carrier frame is received in channels formed in the upper housing and the lower housing to locate and orient the carrier frame in the interior region.

8. The bioptic barcode reader of claim 4, comprising one or more of a vertical illumination printed circuit board, a user interface printed circuit board, a speaker, a color vision camera, a color vision camera illumination printed circuit board, and an off-platter detection system printed circuit board mounted onto the carrier frame.

9. The bioptic barcode reader of claim 4, wherein the horizontal output mirror is mounted onto the lower housing.

10. The bioptic barcode reader of claim 1, wherein the intermediate mirror is a splitter mirror.

11. The bioptic barcode reader of claim 10, wherein the splitter mirror is a concave splitter mirror and the bioptic barcode reader includes two vertical output mirrors.

12. A carrier assembly for a bioptic barcode reader having an upright window and a horizontal window, the carrier assembly comprising:
a carrier frame;
an imaging sensor mounted on the carrier frame and having a field of view, a first portion of the field of view being direct through the upright window and a second portion of the field of view being directed through the horizontal window; and
an intermediate mirror mounted on the carrier frame and configured to direct the first portion of the field of view to at least one vertical output mirror, wherein the at least one vertical output mirror being mounted on the carrier frame.

13. The carrier assembly of claim 12, comprising a main printed circuit board mounted on the carrier frame.

14. The carrier assembly of claim 13, wherein the imaging sensor is mounted on the main printed circuit board.

15. The carrier assembly of claim 12, wherein the carrier frame is a single, integral, unitary part.

16. The carrier assembly of claim 12, wherein the intermediate mirror is a splitter mirror.

17. The carrier assembly of claim 16, wherein the splitter mirror is a concave splitter mirror and two vertical output mirrors are mounted on the carrier frame.

18. The carrier assembly of claim 12, wherein the carrier assembly is configured to be inserted and removed from a housing assembly of the bioptic barcode reader as a single unit.

19. The carrier assembly of claim 18, wherein the carrier frame is configured to be received in channels formed in an upper housing and a lower housing of the housing to locate and orient the carrier frame within the bioptic barcode reader.

20. The carrier assembly of claim 18, wherein no electrical disconnections are required to remove the carrier assembly from the housing.

21. The carrier assembly of claim 12, comprising one or more of a vertical illumination printed circuit board, a user interface printed circuit board, a speaker, a color vision camera, a color vision camera illumination printed circuit board, and an off-platter detection system printed circuit board mounted onto the carrier frame.

22. The carrier assembly of claim 21, wherein the carrier frame comprises one or more of a horizontal illumination cavity and a sound chamber.

* * * * *